United States Patent [19]

Gruber

[11] Patent Number: 5,014,946
[45] Date of Patent: May 14, 1991

[54] HOLDING, RETAINING AND ADHERING MEANS

[76] Inventor: Bruno Gruber, Ordenslandstrasse 39, 8037 Olching, Fed. Rep. of Germany

[21] Appl. No.: 395,684

[22] Filed: Aug. 17, 1989

[30] Foreign Application Priority Data

| Aug. 17, 1988 | [DE] | Fed. Rep. of Germany | ....... 3827832 |
| Mar. 14, 1989 | [DE] | Fed. Rep. of Germany | ....... 3908278 |
| Mar. 14, 1989 | [DE] | Fed. Rep. of Germany | ....... 3908279 |
| May 9, 1989 | [DE] | Fed. Rep. of Germany | ....... 3915147 |
| May 16, 1989 | [DE] | Fed. Rep. of Germany | ....... 3915908 |

[51] Int. Cl.$^5$ ............................................. F16B 47/00
[52] U.S. Cl. .............................. 248/206.5; 248/205.3; 248/205.9
[58] Field of Search ............... 248/205.3, 205.4, 205.5, 248/206.5, 500, 683, 309.4, 205.7, 205.8, 205.9, 363

[56] References Cited

U.S. PATENT DOCUMENTS

| 3,616,096 | 10/1971 | Roeder | ................. 248/205.3 X |
| 3,913,876 | 10/1975 | McSherry | .................. 248/205.3 X |
| 4,003,538 | 1/1977 | Frye | ................. 248/205.3 X |
| 4,778,702 | 10/1988 | Hutter, III | .................... 249/205.3 X |
| 4,863,132 | 9/1989 | Fitzgerald et al. | .......... 248/205.3 X |

Primary Examiner—Ramon O. Ramirez
Attorney, Agent, or Firm—Kirkpatrick & Lockhart

[57] ABSTRACT

A holding, retaining and adhering means comprises a holding member characterized by a flexible plate connected to the bottom surface of a comparatively rigid holding member at a fastening point located at an inner surface of the flexible plate. The flexible plate is adaptable to an unevenness of surface upon which it is placed such that when a tilting or tipping force is applied, a drawing-off force is likewise applied to the rigid holding member.

24 Claims, 4 Drawing Sheets

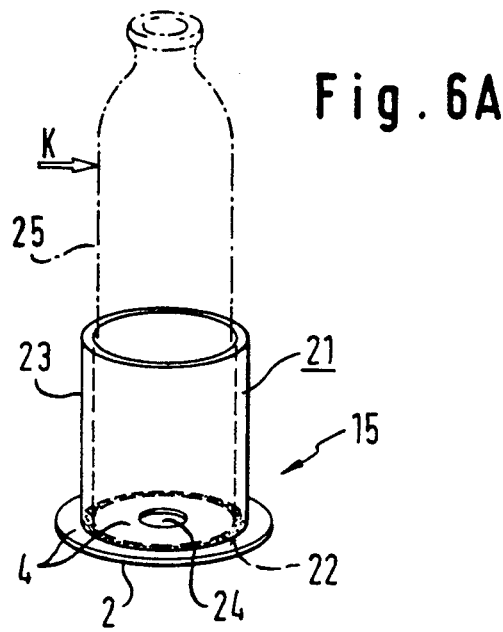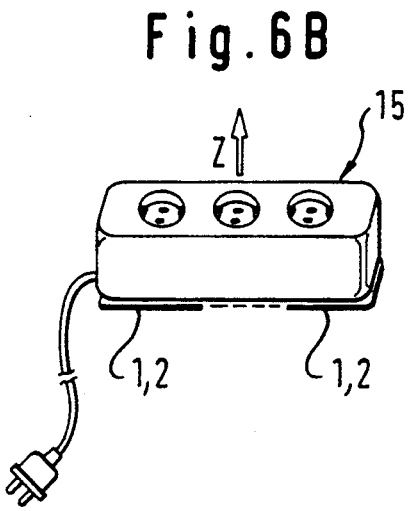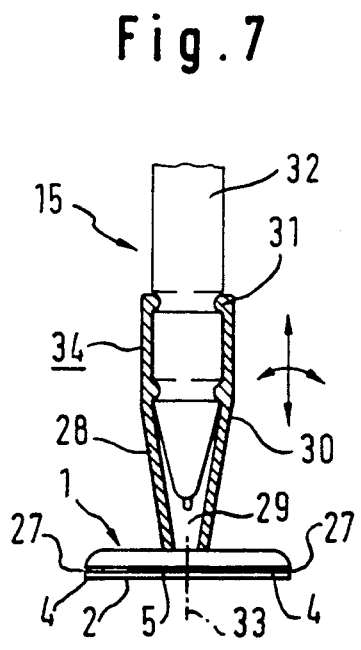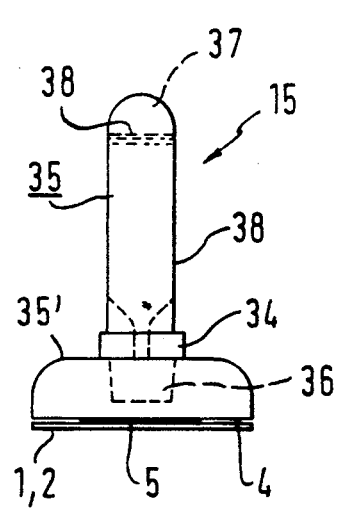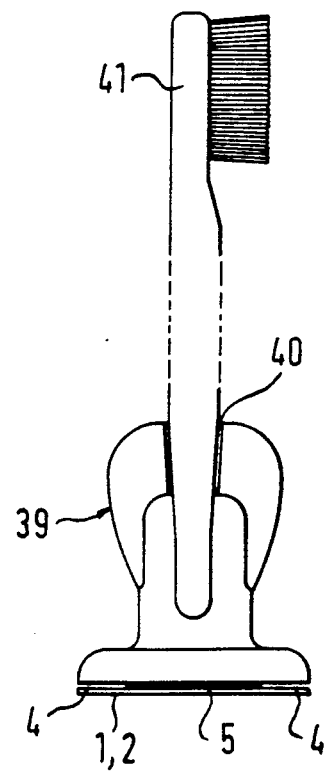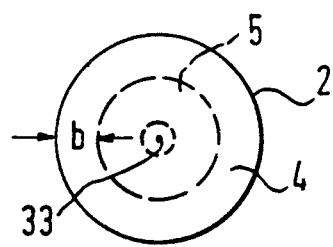

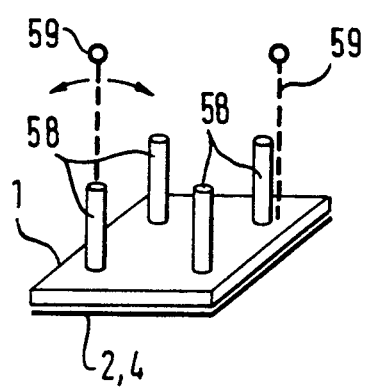
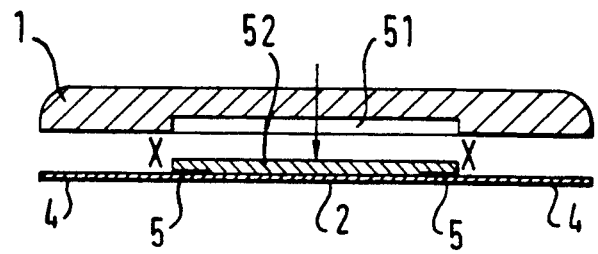
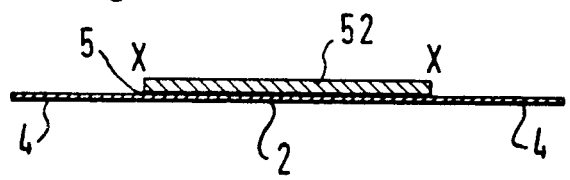
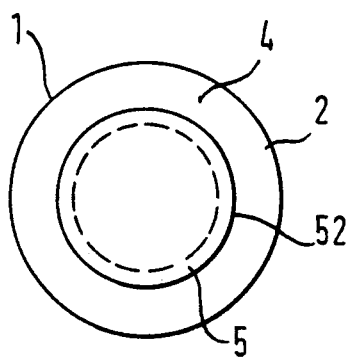
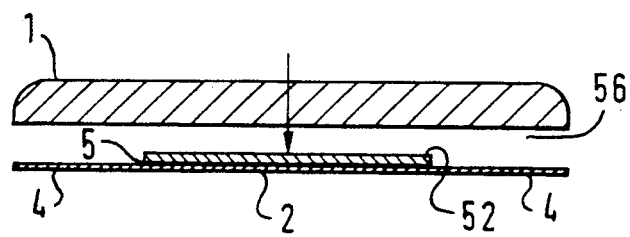
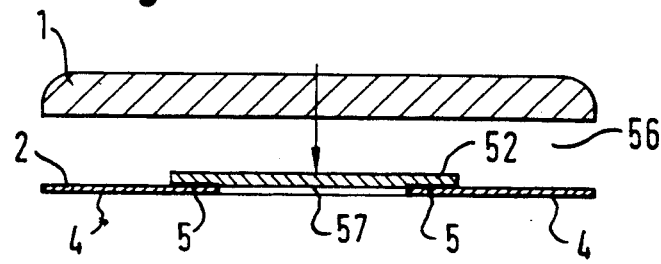
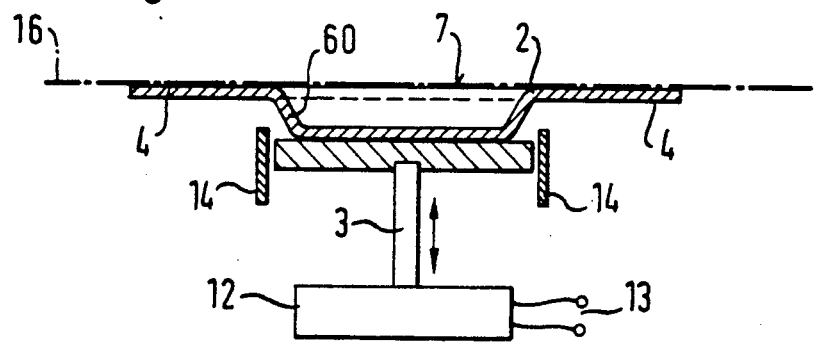

HOLDING, RETAINING AND ADHERING MEANS

Holding members of conventional holding, retaining and adhering means consist of heavy weights often not sufficiently heavy for complying with the requirement of stability or they are made too light and cannot hold and keep devices in a really stable and anti-skid, frictional manner, for instance as a foot or support. The use of suction cups for ensuring a safe holding and retaining means is limited, in particular, because the suction effect thereof on the one hand is restricted merely to really smooth base surfaces and on the other hand it is more or less uncontrollably discontinued after some time. When suction cups are laterally displaced on and along their base surface they immediately lose their suction effect.

It is the object of the invention to provide a holding, retaining and adhering means—called LEVISTOR—for avoiding the said disadvantages, i.e. increasing and improving the stability of services without using additional weights or insecure and immovable suction cups, in this way ensuring substantially improved safety and handling when using said devices.

Surprisingly, according to the invention, a holding, retaining and adhering means comprising a holding member showed very satisfactory results and stood the test, which holding and adhering means according to patent claim 1 is provided with a flexible elastically-movable plate or foil, e.g. of rubber, a synthetic material or the like; the shape of said plate or foil alternatively could generally also be defined as sheet- or blade-like.

Depending upon the forces acting on the holding member and the direction of the forces applied, the fastening of the plate or foil to the bottom surface of the holding member may vary from being spot-shaped to being a surface extension; whereby the surface fastening may also consist of a plurality of adjacent fastening points.

While the surface area of the plate or foil is fixedly connected to the bottom surface of the holding member, it is also comparatively areal and rigid, such as the holding member connected thereto. The marginal projecting portions and marginal areas laterally projecting therefrom are flexible, elastically-movable, and bendable.

The holding, retaining and adhering means according to the invention, when ready for use, rests upon a sufficiently smooth base, merely with its own weight and is freely displaceable thereupon towards all sides. It rests upon the said base with the outer surface of the plate or foil which consists of rubber, a synthetic material or the like, being fixed to the holding member in the range of the inner surface of said plate or foil. The movable marginal projecting portion and marginal area thereof extends laterally outward on the fastening area thereof and is not fastened otherwise.

Only when a drawing-off or pulling-off force is applied to the holding member, i.e. when it is lifted from the base or when a tilting or tipping force is applied, does the subpressure resulting therefrom in the contact plane effect a firm joining and clinging of the flexible, elastically-movable marginal projecting portion and marginal area of the plate or foil towards the base, which starts at the outer edge of said plate or foil. In this way an adherence, according to the invention, of the inner surface area of the plate or foil to the base is ensured up to 1 kg/cm$^2$.

This adhering effect is stronger as a quicker, more impulsive force is applied to the holding, retaining and adhering means according to the invention, i.e. by means of lifting or tilting same.

The flexible, elastically-movable marginal projecting portion and marginal area of the plate or foil is also adapted to an uneven base surface depending on the type of material that is used. During the transfer of forces, the influence of the adhering strength of the holding, retaining and adhering means according to the invention is laterally displaced on the base without any yielding of adherence. Even if there is an intermediate layer between the bottom side of the adhering means (e.g. a sheet of paper or a thin foil) and the base, the adherence continues. Said adherence is particularly strong if there is a liquid (e.g. water, oil) in the plane of adherence and it is also strong under water at a respective hydrostatic pressure.

Even with the adherence effected, the lateral displaceability clearly depends on the hardness of the adhering surface of the plate or foil; with a harder rubber it is greater than with a rubber having a soft surface. Lateral guides may also be provided on the base.

The plate or foil, or the flexible, elastically-movable marginal projecting portion and marginal area may have a different thickness (e.g. from 0.5 to 3.0 mm, 5.0 mm, or 10.0 mm) depending upon the application or stress; it may also decrease in thickness as it extends towards the outer edge thereof and also include inlays or insertions (metal or texture) for a laterally directed and improved stability.

According to the invention, the holding means may be embedded in the material of the flexible plate or foil or both parts may be provided in one piece; the contact surfaces thereof being adapted to the contours of the surface of the base and structure.

The plate or foil material used should be adapted to the respective range of working temperatures. At high temperatures heatproof materials are to be used.

The width of the freely movable marginal projecting portion and marginal area around the fastening area of the inside of the plate or foil, i.e. the distance from the edge of the marginal area, also depends on the various conditions of application and may range from approx. 0.8 mm (or in special cases even less) up to preferably 1.5 cm, from 2.0 cm up to approx. 5.0 cm, or from 2.0 cm to 3.0 cm. According to the invention, the holding, retaining and adhering means, when resting upon the surface of the base, does not have a prestressed vacuum, such that when lifted extremely carefully it does not have any adhering effect. In the position ready for use, the marginal projecting portion and marginal area sits closely to the surface of the base merely by its own weight and, if required, can be supported by a lateral covering portion of the holding member.

The area of the freely movable marginal projecting portion and marginal zone of the plate or foil is relatively large when compared to the fastened inner surface thereof; though the most effective proportion of these two areas depends on various other limiting quantities or influential factors, such as the absolute size of the total surface, the total adhering strength, and the impulse strength to be expected. The surface ratio may be e.g. 99:1 with respect to an almost spot-shaped fastening face and e.g. 10:90 with respect to a large fastening face; other ratios may be applicable and vary accordingly.

The marginal projecting portion and marginal area does not have to be arranged only around the inner surface portion. In many cases, a continuous marginal zone or marginal area extending in only three lateral directions is sufficient; namely when the tilting force applied to the holding and adhering means is applied in such a manner that the plate or foil is pressed against the base in the fourth of the respective lateral directions and in such a manner that on this side there occurs a pressure sealing by means of the elastic rubber. The holding member and the plate or foil may have any circumferential shape desired (square, round, rectangular). With respect to a triangle, only two sides thereof must have marginal areas when there is a respective direction of force.

In all the cases, the lower edge of the holding member operates as an abutment for a tilting or tipping force to be applied thereto via a lever arm rod projecting therefrom in a direction opposite to the adhering plane or via a device fixed thereto. Also, if the holding member is provided with fixed and firm covering portions that project laterally beyond the fastening and marginal areas, such covering portions also serve as lateral marginal stops and at the same time protectively cover the elastically-flexible marginal projecting portion and marginal area.

In the simplest of cases, for many purposes and applications, the elastically-movable, flexible plate or foil, according to the invention consists of a continuous web of material that extends in one piece over and along the marginal areas and the inner surface and is connected to the holding member at the fastening in a rigid manner and, if required, can have recesses within the range of the fastening area.

For an improved adaptation to the contours of the base, several independent adhering means may be combined with one another or an enlarged plate or foil may be provided with holding members being located at several places or positions.

The invention also comprises a rubber or plastics foil (or synthetic material)—that consists of a web of material or cut material that is provided for the use with a plate or foil for a holding and adhering means, and may be used in combination with a thin intermediate plate already fixed thereto, which is already firm or rigid in combination with the bottom side of a holding or adhering member or a device to which the intermediate plate and the plate or foil is fixed, e.g. glued, at a fastening area thereof, thereby permitting a device to be attached at the free side thereof, either directly or via a holding member.

For an improved adaptation to the contours of the base or to different forces applied, several independent adhering means may be combined with one another or an enlarged flexible, elastically-movable plate or foil may be provided with holding members in several places, said holding members being adjustably fixed, if required.

For discontinuing the adhering strength, the outer edge of the marginal area of the plate or foil may be lifted by means of a flap, tongue, lug or the like or a sealable air inlet opening that extends through the holding member may be provided.

In order to extend the range of applications of the holding, retaining and adhering means according to the invention to include adherence to ferro-magnetic base surfaces in the already firm and rigid holding and retaining range, a magnetic portion may be provided at the inner surface of the plate or foil. Likewise, the holding member itself or the plate or foil may be provided with a magnetic effect. In such case, a certain stability or adherence to vertical walls or to ceilings is taken over by the magnetic effect. However, the adherence is increased and intensified at the moment an impact stress or shock load is applied. This is due to the adhering effect achieved by the plate and foil-like design.

The invention furthermore comprises the combination of the above-described holding, retaining and adhering means with an additional subpressure or pressure control means which, at the holding portion of the holding member, is surrounded by the flexible, elastically-movable marginal area and marginal projecting portion of the plate or foil and extends therethrough to be connected to the adhering plane at the base surface. On the one hand, by the influence of a relatively low subpressure or vacuum, i.e. also with a low efficiency, an extraordinarily strong and durable reinforcement and improvement of the adherence can be achieved. On the other hand, the strength at the moment of starting and finishing the adhering effect can be controlled easily and exactly by valves.

The aforementioned combination, above all, is particularly advantageous for the handling of parts such as workpieces, and the extended use of tools.

A further increase in the adhering effect according to the invention is achieved by providing, at the holding member, a vibration means, e.g. battery-operated (an unbalanced electric motor, a piezo-vibrator, a loudspeaker or the like), such that vibrations from 20 to 30 or 50 Hertz (c/s) are sufficient to suspend from a ceiling, a weight of more than 500 g with a plate or foil of approximately 5 cm×5 cm of synthetic material, whereby the lateral displaceability is decidedly easy with an extremely low friction.

According to this embodiment of the invention, the plate or foil, which is flexible and elastically-movable at the marginal area thereof, may be somewhat stiffer or more rigid in comparison with the aforementioned plate or foil. In this way, the holding means also adheres to the contours of a corrugated surface when there is lateral motion.

The adherence also may be improved by a vibration caused by a lateral displacement over and along a corrugated surface. This is also applicable to a vibrating and shock vibrating base as well as to the attachment of a vibrating inertia mass at the holding member. Even higher vibrations of up to 1 kc/s are applicable.

The invention is described in detail in the following Figures in view of several embodiments thereof.

FIG. 6A is a view of a practical application of the invention for example, a bottle stand;

FIG. 6B is a view according to FIG. 6A, for example, a socket bar;

FIG. 7 and 8 are a sectional view and a bottom view, respectively, of a further modified embodiment of the invention;

FIG. 9 is a schematic view of a moistening device;

FIG. 10 is a schematic side view of a further practical embodiment of the invention (tooth brush stand) comprising a clamping respectively snap holder;

FIG. 16 is a view of a further embodiment of the invention that reinforces and improves the adherence;

FIG. 17a to c and

FIG. 18 as well as

FIG. 19 are longitudinal sections of different variations of the invention showing the attachment of the flexible, elastically-movable plate or foil and an intermediate plate, to the bottom side of the holding member (FIG. 17c showing a plan view of the top side); and FIG. 20 is a longitudinal sectional view of a holding, retaining and adhering means according to the invention comprising an additional intensification of adherence by means of a co-operating vibration means.

Figure 1:
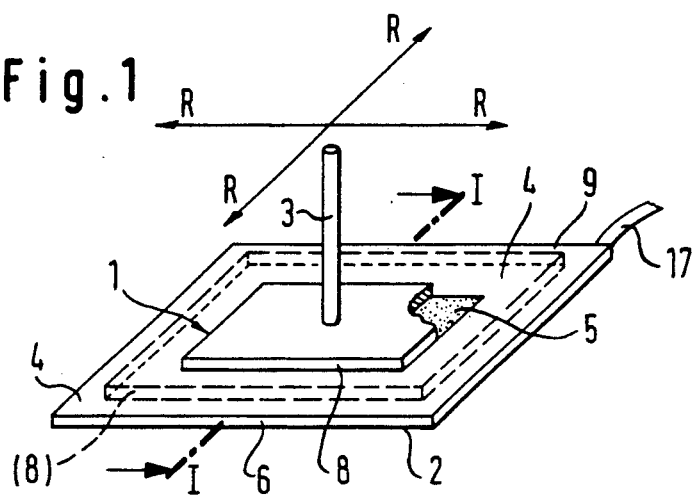
FIG. 1 is a perspective schematic view of the holding, retaining and adhering means according to the invention.
Figure 3:
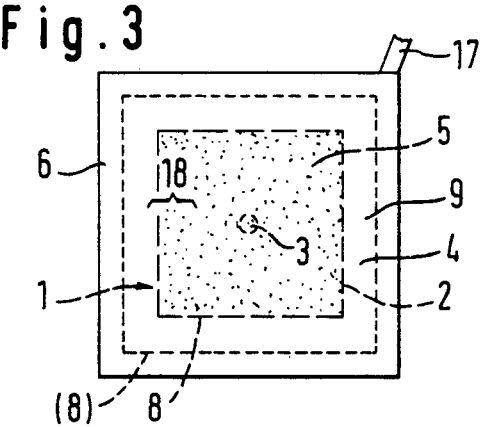
FIG. 3 is a bottom view of a modified holding, retaining and adhering means according to the invention.

As described in FIGS. 1 and 3, a flexible, elastically-bendable or elastically-movable plate or foil 2 is, (at the inner surface thereof, fixedly connected to the bottom side or area of a substantially rigid holding member 1 (by means of glue or vulcanization) via a fastening area 5, in such a manner that, at the bottom side of the holding, retaining and adhering means, an inner area 1 and a firm or rigid holding portion within fastening area 5 is created. A marginal projecting portion 4 and marginal area laterally extends beyond the outer rim or edge 8 of holding member 1 and can be totally or partly covered by a covering portion 9 that laterally projects from the fastening area 5 and has an outer rim or edge (8). As shown in FIG. 1 and 3, marginal projecting area 4 is not fixed to the covering portion 9 and therefore is not impaired as far as the flexible, elastically-movable constitution thereof is concerned. The marginal projecting portion 4, up to the outer rim or edge 6 thereof, in particular from the transition area 19 (FIG. 3) that extends towards the fastening area 5, is kept laterally extending away from the area 1 and firm holding portion and together with the holding portion provides on a contact surface 7 upon a base surface 10 in a position ready for use; no stress being imposed.

Figure 2A:
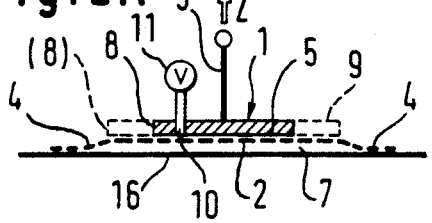
FIG. 2A and 2B are schematic cross-sectional views along the line I—I in FIG. 1 for explaining the operation of the invention.
Figure 2B:
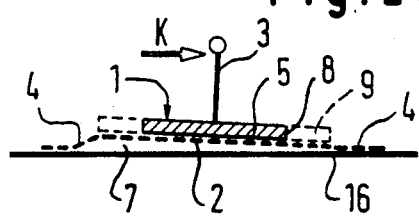

Upon the influence of a traction Z (FIG. 2A) or a tilting or tipping force K (FIG. 2B), a gap-shaped vacuum space results in the contact surface 7 such that, due to the vacuum provided in this way, the marginal projecting portions 4 and marginal areas firmly cling to the base surface 16 and ensure the adhering effect. When a tilting or tipping force K is applied, the lower edge of the rim 8 functions as a lever arm support.

The elasticity of the marginal projecting portions 4 and marginal area is chosen so that the same joins and clings to the surface of base 16 to thereby provide an optimum seal. The adhering strength in air is up to 1 kg/cm² of the already firm holding portion. The adherence may either be released by a simple tongue or lug 17, by lifting rim 60, or by an air inlet opening 18 that is controlled, if required, by a valve 11.

Figure 4:
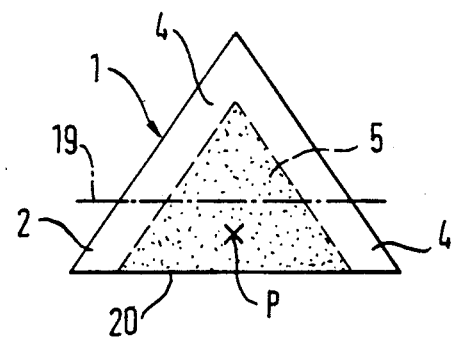
FIG. 4 is a bottom view of a modified holding, retaining and adhering means according to the invention.

The holding, retaining and adhering means may have any circumferential shape desired and the marginal portions 4 may extend towards three lateral directions R. With respect to a triangular circumferential shape, (FIG. 4) the marginal projecting portion 4 and marginal area may be omitted at rim side 20, in case the tilting or tipping force K (from above the holding and adhering means) is applied in the direction of said rim side 20. Likewise when a tilting force is applied over a tilting line 19 in this connection, the necessary sealing is achieved and ensured by pressing the rubber-like foil or plate towards the base 16.

Any devices 15 desired to be secured by way of adherence, such as (FIG. 6B) a socket bar, may be fixed to the side of the holding member 1 opposite the plate or foil 2 and, if necessary, also by way of a combined use of several adhering means. A plug may be pulled out from the socket bar in the direction of traction Z with only one hand.

FIG. 6A shows a bottle stand 21 for a bottle 25 that consists of a sleeve-shaped receiving member 23 that has a front face 22 fixed onto the top side of foil 2, wherein the marginal projecting portions 4 thereof extend radially inwardly and outwardly such that the inner marginal portion 4 is defined by the recess opening 24. If such an opening does not exist, the adherence is effected merely by the apron formed by the outer marginal projecting portion 4. The adherence would also be provided if recess opening 24 in sleeve-shaped receiving member 23 was closed.

Figure 5:
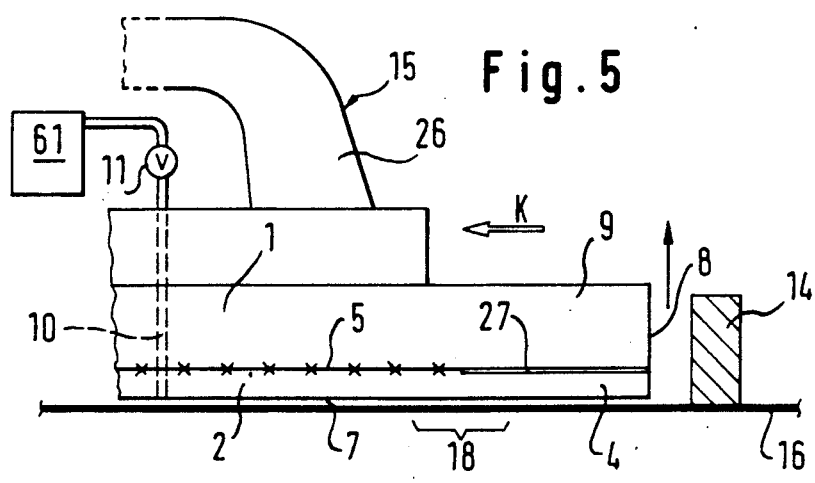
FIG. 5 is an enlarged partial sectional view of a lateral portion of the holding, retaining and adhering means according to the invention.

In the enlarged schematic partial sectional view according to FIG. 5, in which a handle 26 is provided as an example, with respect to the intermediate plane 27, the free plane is illustrated extending laterally outside of fastening area 5 between the upper side of the marginal area 4 and the bottom side of the already rigid and firm lateral covering portion 9. In the said plane, profilings (e.g. corrugations, etc.) or a gap distance (see also FIGS. 18 and 19) may be provided in order to prevent an adhesion (e.g. by a drop of water) and to ensure that the marginal projecting portion 4 that projects laterally from the holding portion in a self-supporting, and inherently stable manner even without the base, remains free for adherence to base 16.

For lateral displaceability, lateral guiding elements 14 (compare FIG. 20) may be provided.

In order to exactly control the adherence vacuum in the contact plane 7, i.e. to increase or to discontinue same at a precisely defined time, as shown in FIG. 5 (analogous FIG. 2A), a valve channel 10, an (air) pressure control or a vacuum means 61, and if required, a valve 11 (e.g. a relief valve) may be provided.

Another device 15 may consist of a receiving sleeve 28 for a felt pen 32, which is kept within receiving member 30 by a snap sealing means 31 or a clamp sealing means and can be picked out therefrom with one hand opposing the action of the adhering means. FIG. 8 defines the position and width b of the marginal projecting portion 4. The inner space 29 can be connected to the bottom side of the adhering means as illustrated by line 33, such that the receiving sleeve 28 does not adhere when felt pen 32 is pulled out therefrom.

Another device may be a moistener 35 as shown in FIG. 9, that is used with one hand only. The little moistening sponge 36 thereof, is plugged in a moisture container 34 by clamp sealing means 31; the handle thereof further providing a fill-up liquid 38 comprising an air cushion. Instead of a sealing member, a simple snap or clamping mounting 40 for a tooth brush 41 in a tooth brush stand 39 may be provided (FIG. 10).

Figure 11:
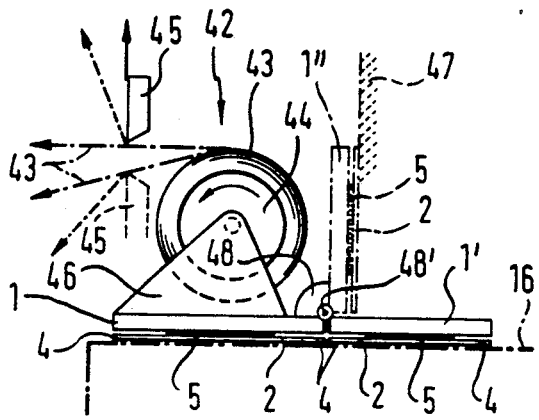
FIG. 11 is a further schematic side view of a concrete embodiment of the invention in the form of a foil and adhesive tape roller means.

With respect to a foil of adhesive tape roller means 42, FIG. 11 illustrates that the holding and adhering means may be arranged laterally and in an angle adapted to the force applied. The adhesive tape 43, that is drawn off roll 44, may be torn off at (alternative) sharp edges 45 either upwardly or downwardly. The height of the stand 42 and its arrangement with respect to the adhering means, as well as the drawing-off direction, determine the drawing-off force kept. When resting upon a table that serves as base 16, the rear adhering means (holding member 1') may be folded back flatly about a joint or link 48'; when supported against a wall 47, it may be folded upwardly and locked in this position with an angle holder 48.

Figure 12A:
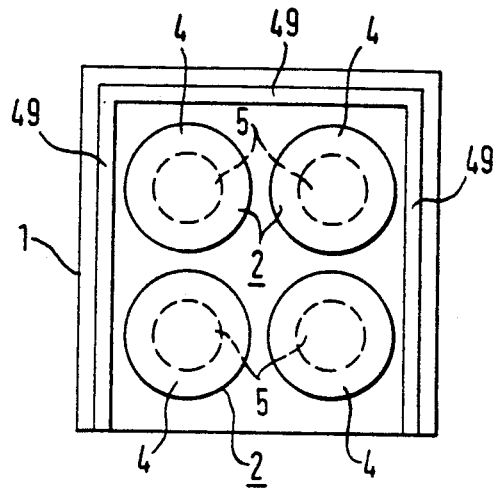
FIG. 12A and 12B are a view from the bottom and a side view, respectively, of an embodiment of the invention comprising a plurality of separate holding, retaining and adhering means with anti-skid strips being arranged additionally.
Figure 13:
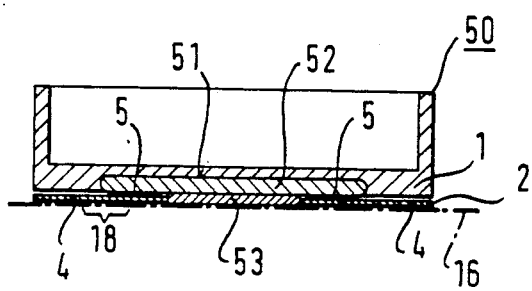
FIG. 13 is a lateral sectional view of a holding, retaining and adhering means combined with a magnetic adherence.
Figure 12B:
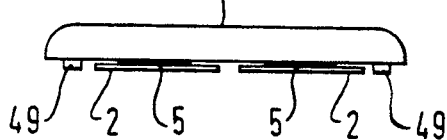

In order to reduce the lateral displaceability (FIG. 12A and 12B) anti-skid and frictional strips 49 of a special anti-skid and frictional material may be provided at the holding member 1; the height thereof being adapted to the function of the plate or foil 2.

In the bottom of a saucer-like holding means 50 that consists of a holding wall 50' that extends upwardly to fit closely around the wall of a cup, a recess 51, into which an intermediate plate 52 may be inserted in a form - or force-locking manner (if required, same may also be taken out again) may be provided. Below the center of intermediate plate 52, at the same level as the plate or foil 2, a magnetic surface 53 may be arranged.

Figure 14:
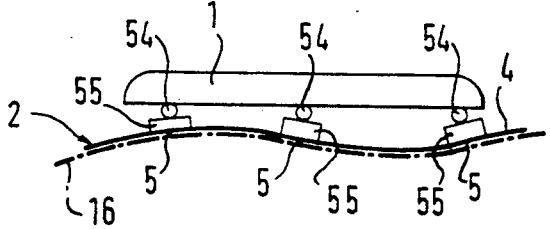
FIG. 14 is a view of a holding, retaining and adhering means according to the invention comprising several adjustable and hangedly supported intermediate portions which serve as holding members to a flexible, elastically-movable plate or foil.

An adaptation of the holding and adhering means to an uneven base surface 16 may be effected by intermediate portions 55 and pivoting links 54. As shown in FIG. 14, a flexible, elastically-movable plate or foil 2 having an enlarged area with several holding members arranged at a distance to one another that functionally corresponds to a marginal section 4, may be provided.

Figure 15A:
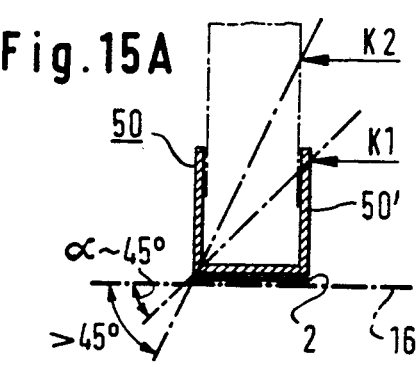
FIG. 15A and 15B are schematic side views showing the function of the lever arm angle with the holding, retaining and adhering means according to the invention.
Figure 15B:
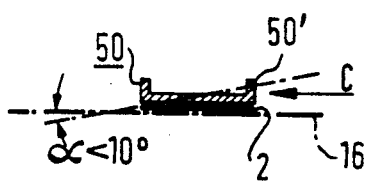

With respect to the saucer-like holding means 50, according to FIG. 15A and 15B, the manner in which the force direction angle of tilting forces K1 and K2 as well as of a displacement force acts upon the adherence is illustrated. In this connection, anti-skid strips, friction bars, magnetic elements, or a vibration adherence may be advantageous with respect to a small angle.

As shown in FIG. 16, such vibration adherence, in the simplest of cases may consist of inertia masses 59 springyly arranged at a distance above the holding member 1. Such masses already have a slight lateral spring action and the vibration resulting therefrom brings about a distinct adherence to the base to thereby inhibit a lateral displacement force. According to FIG. 16, holding rods 58 are provided with a saucer-like holding means for holding objects such as a cigarette package in situations where there is much environmental motion, for example in a train, airplane, or ship.

As shown in FIG. 17, the combinations of intermediate plates 52 may be connected to holding member 1 by means of snap connections X or, as shown in FIG. 18 and 19, by means of adhesive connections and may be advantageous for cleaning purposes or for repairing or replacing devices.

While, according to FIG. 17A, intermediate plate 52 is provided with fastening area 5 only at the outer marginal portion thereof, intermediate plates 52, according to FIG. 17B and 18, are connected to a continuous plate and foil-like, flexible and elastically-bendable material that is provided in one piece over and along the entire face thereof. According to FIG. 18, there is a free intermediate gap 56 and according to FIG. 19 there is a central recess opening in the plate or foil 2; the fastening area 5 again only being provided at the margin.

With the holding, retaining and adhering means being reinforced and improved by a vibration means 12 according to FIG. 20, weights can easily be kept laterally displaceable beneath an overhung ceiling that serves as base 16 and, if required, guided in guides 14. Such a combined adhering means may be used to lift and laterally transport or lead away plate-like or table-like objects and may also be used for guiding and deflecting moved conveyor belt portions.

The material of the vibrating plate or foil 2, according to this combined structure, may and should have a somewhat higher inherent rigidity in the marginal projecting portions 4 thereof. When using a deformable synthetic material, the frictional contact of the total base 16 may be reduced by a profiling of the plate or foil 2, for instance in the form of a distance deformation 60.

I claim:

1. A holding, retaining and adhering means, comprising a rigid holding member having a bottom surface, a flexible and elastically-movable plate having a first surface adapted for engaging a base surface and a second surface with at least one fastening area at an inner portion thereof and arranged at a distance with respect to an edge of said plate, wherein said fastening area of said plate is connected to the bottom surface of said holding member such that a marginal projecting portion provided between said fastening area and said edge of said plate adheres to the base surface when a force traverse to the plane of the base surface is applied to said holding member.

2. A holding, retaining and adhering means according to claim 1, characterized in that said fastening area of said plate is smaller than the second surface of said plate.

3. A holding, retaining and adhering means according to claim 2, characterized in that a ratio of an area of said marginal projecting portion of said plate with respect to the fastening area is between 99:1 and 10:90.

4. A holding, retaining and adhering means according to claim 1, characterized in that said marginal projecting portion of said plate projects from said fastening area in at least three lateral directions.

5. A holding, retaining and adhering means according to claim 1, characterized in that said bottom surface of said holding member covers a portion of said marginal projecting portion of said plate in at least one lateral direction by means of a lateral covering portion.

6. A holding, retaining and adhering means according to claim 5, characterized in that said second surface of said plate in the area of said marginal projecting portion and the bottom surface of the lateral covering portion of the holding member are textured.

7. A holding, retaining and adhering means according to claim 1, characterized in that said plate is detachable from said bottom surface of said holding member.

8. A holding, retaining and adhering means according to claim 7, characterized in that said plate is connected to said bottom surface of said holding member in a form-locking detachable manner.

9. A holding, retaining and adhering means according to claim 7, characterized in that said bottom surface of said holding member juxtaposed from said fastening area is detachable from the rest of said holding member in a form-locking manner.

10. A holding, retaining and adhering means according to claim 7, characterized in that said plate with said fastening area thereof is fixed to a comparatively rigid intermediate plate, which is connectable to said holding member.

11. A holding, retaining and adhering means according to claim 1, characterized in that said plate is constructed of magnetic material.

12. A holding, retaining and adhering means according to claim 1, characterized in that said holding member is embedded in said fastening area of said plate.

13. A holding, retaining and adhering means according to claim 1, characterized in that a lever arm is fixed to said holding member and transmits the force transverse to the plane of the base surface to said plate which clings to the base surface.

14. A holding, retaining and adhering means according to claim 1, characterized in that a plurality of flexible and elastically-movable plates are attached to said bottom surface of said holding member.

15. A holding, retaining and adhering means according to claim 1, characterized in that an inertial mass that swings in response to an impulse projects from a plane of said plate which clings to the base surface.

16. A holding, retaining and adhering means according to claim 1, further comprising a device having clamping means for holding an instrument, said device being fixed to said holding member and out of which the instrument may be pulled or picked with one hand, while the holding, retaining and adhering means adheres to the base surface.

17. A holding, retaining and adhering means according to claim 1, additionally comprising a clamp seal defining an inner space, and wherein a recess opening is provided in said fastening means of said plate directed towards the base surface and said inner space formed by said clamp seal.

18. A holding, retaining and adhering means according to claim 1, additionally comprising a plurality of holding members situated at a lateral distance with respect to each other on said plate.

19. A holding, retaining and adhering means according to claim 18, wherein said holding members are attached to said plate by means of pivoting joints for alignment with respect to various positions of the base surface.

20. The holding, retaining and adhering means of claim 1 wherein said plate is constructed of rubber.

21. The holding, retaining and adhering means of claim 1 wherein said plate is constructed of a synthetic material.

22. The holding, retaining and adhering means of claim 1 wherein said fastening area of said plate is glued to said bottom surface of said holding member.

23. The holding, retaining and adhering means of claim 1 wherein said fastening surface of said plate is vulcanized to said bottom surface of said holding member.

24. The holding, retaining and adhering means of claim 1 additionally comprising a pressure control device to supply one of a suction effect between said plate and the base surface and a releasing effect between said plate and the base surface.

* * * * *

UNITED STATES PATENT AND TRADEMARK OFFICE
CERTIFICATE OF CORRECTION

PATENT NO. : 5,014,946
DATED : May 14, 1991
INVENTOR(S) : Bruno Gruber

It is certified that error appears in the above-identified patent and that said Letters Patent is hereby corrected as shown below:

Col. 4, line 49, after "applicable." insert the following paragraph --Further features of the invention in combinations thereof are defined in patent claims 2- 24.--

Signed and Sealed this

Twenty-eighth Day of September, 1993

Attest:

BRUCE LEHMAN

Attesting Officer

Commissioner of Patents and Trademarks